United States Patent
Gang

(10) Patent No.: US 12,066,952 B2
(45) Date of Patent: Aug. 20, 2024

(54) DATA PROCESSING METHOD AND SYSTEM, DEVICE, AND MEDIUM

(71) Applicant: INSPUR SUZHOU INTELLIGENT TECHNOLOGY CO., LTD., Jiangsu (CN)

(72) Inventor: Yazhou Gang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/261,075

(22) PCT Filed: Oct. 29, 2021

(86) PCT No.: PCT/CN2021/127509
§ 371 (c)(1),
(2) Date: Jul. 11, 2023

(87) PCT Pub. No.: WO2023/000536
PCT Pub. Date: Jan. 26, 2023

(65) Prior Publication Data
US 2024/0086332 A1    Mar. 14, 2024

(30) Foreign Application Priority Data
Jul. 19, 2021  (CN) .......................... 202110811435.4

(51) Int. Cl.
G06F 12/00    (2006.01)
G06F 12/1009  (2016.01)
(52) U.S. Cl.
CPC .............. *G06F 12/1009* (2013.01)

(58) Field of Classification Search
CPC .................................................. G06F 12/1009
See application file for complete search history.

(56) References Cited

U.S. PATENT DOCUMENTS 8,019,925 B1    9/2011  Vogan et al.
2018/0088815 A1    3/2018  Lei

FOREIGN PATENT DOCUMENTS

CN    103049390 A    4/2013
CN    103164346 A    6/2013
(Continued)

OTHER PUBLICATIONS

Chinese First Office Action for Chinese Serial No. 202110811435.4 on Aug. 31, 2021, 14 pgs.
(Continued)

*Primary Examiner* — Reginald G Bragdon
*Assistant Examiner* — Michael L Westbrook
(74) *Attorney, Agent, or Firm* — Merchant & Gould P.C.

(57) ABSTRACT

Provided is a data processing method, which includes: in response to a logical volume receiving a write request, whether a logical address carried in the write request is occupied by a data unit in the logical volume is determined; if not, a data grain which is closest to the size of a data block and is greater than the size of the data block is determined; a new data unit is created in the logical volume by use of the logical address as an initial address and by use of the closest data grain as the length, and a logical address range occupied by the data block in the new data unit is recorded; the data block is written into an underlying storage and a written physical address is returned; and a mapping relationship between the initial address and the physical address is established and saved.

14 Claims, 3 Drawing Sheets

(56) References Cited

FOREIGN PATENT DOCUMENTS

| | | | |
|---|---|---|---|
| CN | 104461914 | A | 3/2015 |
| CN | 107122131 | A | 9/2017 |
| CN | 108268380 | A | 7/2018 |
| CN | 108459826 | A | 8/2018 |
| CN | 110471861 | A | 11/2019 |
| CN | 113282249 | A | 8/2021 |

OTHER PUBLICATIONS

International Search Report and Written Opinion received for PCT Serial No. PCT/CN2021/127509 on Apr. 19, 2022, 9 pgs.
Chinese Search Report received for Chinese Serial No. 2021108114354 on Aug. 24, 2021, 2 pgs.
Chinese Decision to Grant received for Chinese Serial No. 2021108114354 on Oct. 8, 2021, 3 pgs.

DATA PROCESSING METHOD AND SYSTEM, DEVICE, AND MEDIUM

CROSS-REFERENCE TO RELATED APPLICATIONS

The present application is a National Stage Filing of PCT International Application No. PCT/CN2021/127509 filed on Oct. 29, 2021, which claims priority to the Chinese patent application No. 202110811435.4, filed before the China National Intellectual Property Administration (CNIPA) on Jul. 19, 2021, which is incorporated herein by reference in its entirety.

TECHNICAL FIELD

The disclosure relates to the field of storage, and in particular to a data processing method and system, a device and a storage medium.

BACKGROUND

Mete data refers to the data about data, which can be understood as data with a broader scope than general data and which not only represents information such as data type, name and value, but also further provides context information of the data, such as a data domain and a data source. In a data storage system, data rain is a basis of data information storage and the smallest unit of data. In recent years, with the development of information technology, massive data has been generated, but how to effectively manage and organize these massive data has become a prominent problem. For a large amount of stored data, only by querying and analyzing the data content and data meaning therein can the data be more effectively used. Efficient organization and management of the meta data in the storage system is an effective means to solve the problem, which can support the management and maintenance of the data in the system.

In full flash data storage, a large number of highly concurrent data access and query issues are bound to be involved. Only effective management of the data and meta data can increase concurrent access and access efficiency. The smaller the logical block in a full flash storage system is divided, the more mapping relationship between a logical address and a physical address is generated. Accordingly, the greater the amount of the generated meta data is, the more meta data management, insertion, mirroring and disc flashing etc. are consumed, and the management cost is very high, which may directly affect the performance and latency of a host. Therefore, an effective management method for multi-concurrent read and write of the data in a full flash memory is crucial. The less the amount of the meta data is, the more efficient meta data management is, which can make large-scale concurrent random access to data have higher throughput and lower latency.

Therefore, there is an urgent need for a data storage method that can reduce the amount of the meta data.

SUMMARY

In view of this, in order to overcome at least one aspect of the above problems, embodiments of the disclosure provide a data processing method, including the following steps.

It is judged, in response to a logical volume receiving a write request, whether a logical address carried in the write request is occupied by a data unit in the logical volume.

In response to the logical address carried in the write request not being occupied by the data unit in the logical volume, a data grain which is closest to the size of a data block corresponding to the write request and which is greater than the size of the data block is determined from a plurality of preset data granularities.

A new data unit is created in the logical volume by use of the logical address as an initial address and by use of the closest data grain as the length, and a logical address range occupied by the data block in the new data unit is recorded.

The data block is written into an underlying storage and a written physical address is returned.

A mapping relationship between the initial address corresponding to the new data unit and the physical address is established and saved.

In some embodiments, the following operations are further included.

In response to the logical address carried in the write request being occupied by the data unit in the logical volume, a logical address range corresponding to the data block is determined according to the logical address carried in the write request and the size of the data block.

A relationship between the logical address range corresponding to the data block and the logical address range of the data unit is determined.

In response to the logical address range corresponding to the data block being the same as the logical address range of the data unit, the data block is written into the underlying storage and the written physical address is returned.

The mapping relationship between the initial address corresponding to the data unit and the returned physical address is re-established and saved.

In some embodiments, the following operations are further included.

In response to the logical address range corresponding to the data block being within the logical address range of the data unit, another data block is acquired from the underlying storage according to the mapping relationship corresponding to the data unit.

It is judged whether the logical address range corresponding to the data block is occupied by the another data block.

In response to the logical address range corresponding to the data block not being occupied by another data block, the acquired another data block is merged with the data block, and the merged data block is written into the underlying storage and the written physical address is returned.

The mapping relationship between the initial address corresponding to the data unit and the returned physical address is re-established and saved.

In some embodiments, the following operations are further included.

In response to the logical address range corresponding to the data block being occupied by the another data block, a logical address range the same as the another data block is determined.

The same logical address range is removed from the logical address range corresponding to the another data block and then a sub-logical address range is obtained.

A sub-data block corresponding to the sub-logical address range in the another data block is determined, and the sub-data block is merged with the data block.

The merged data block is written into the underlying storage and the written physical address is returned, so as to re-establish and save the mapping relationship between the initial address corresponding to the data unit and the returned physical address.

In some embodiments, the following operations are further included.

In response to a part of the logical address range in the logical address range corresponding to the data block being within the logical address range of the data unit, the another data block is acquired from the underlying storage according to the mapping relationship corresponding to the data unit.

It is judged whether the part of the logical address range is occupied by the another data block.

In response to the part of the logical address range not being occupied by the another data block, the acquired another data block is merged with a part of the data block corresponding to the part of the logical address range, and the merged data block is written into the underlying storage and the written physical address is returned, so as to re-establish and save the mapping relationship between the initial address corresponding to the data unit and the returned physical address.

In response to the part of the logical address range being occupied by the another data block, the logical address range the same as the another data block is determined.

The same logical address range is removed from the logical address range corresponding to the another data block and then a sub-logical address range is obtained.

A sub-data block corresponding to the sub-logical address range in the another data block is determined, and the sub-data block is merged with the part of the data block.

The merged data block is written into the underlying storage and the written physical address is returned, so as to re-establish and save the mapping relationship between the initial address corresponding to the data unit and the returned physical address.

In some embodiments, the following operations are further included.

With respect to another part of the logical address range beyond the logical address range of the data unit in the logical address range corresponding to the data block, a data grain which is closest to the size of another part of the data block corresponding to the another part of the logical address range and which is greater than the size of the another part of the data block is determined from the plurality of preset data granularities.

A data unit to be created is created in the logical volume by use of the initial address of the another part of the logical address range as the initial address of the data unit to be created and by use of the closest data grain as the length, and the logical address range occupied by the another part of the data block in the data unit to be created is recorded.

The another part of the data block is written into the underlying storage and the written physical address is returned, so as to establish and save the mapping relationship between the initial address corresponding to the data unit to be created and the returned physical address.

In some embodiments, the following operations are further included.

In response to the logical volume receiving the read request, the number of corresponding data units is determined according to the logical address range corresponding to data to be read carried in the read request.

In response to corresponding to one data unit, the corresponding physical address is acquired according to the initial address corresponding to the data unit, so as to read the data to be read in the underlying storage according to the physical address.

In response to corresponding to a plurality of data units, the read request is split into a plurality of sub-read requests, where each sub-read request reads data corresponding to one data unit.

The corresponding physical address is acquired according to the initial address corresponding to each data unit.

It is judged whether the acquired multiple corresponding physical addresses are continuous or not.

In response to the acquired multiple corresponding physical addresses being continuous, the plurality of sub-read requests are constructed as one Input/Output (IO) and the IO is issued to the underlying storage to return data corresponding to the multiple continuous physical addresses.

In response to the acquired multiple corresponding physical addresses being non-continuous, the plurality of sub-requests are constructed as a plurality of IOs according to the corresponding physical addresses, the IOs are issued to the underlying storage in sequence, and then the corresponding data is returned.

On the basis of the same application concept, according to another aspect of the disclosure, the embodiments of the disclosure also provide a data processing system, including: a judging module, a first determination module, a creating module, a write module and a meta data module.

The judging module is configured to judge, in response to a logical volume receiving a write request, whether a logical address carried in the write request is occupied by a data unit in the logical volume.

The first determination module is configured to determine, in response to the logical address carried in the write request not being occupied by the data unit in the logical volume, a data grain which is closest to the size of a data block corresponding to the write request and which is greater than the size of the data block from a plurality of preset data granularities.

The creating module is configured to create a new data unit in the logical volume by use of the logical address as an initial address and by use of the closest data grain as the length and to record a logical address range occupied by the data block in the new data unit.

The write module is configured to write the data block into an underlying storage and return a written physical address.

The meta data module is configured to establish and save a mapping relationship between the initial address corresponding to the new data unit and the physical address.

On the basis of the same application concept, according to another aspect of the disclosure, the embodiments of the disclosure also provide a computer device, including at least one processor, and a memory.

The memory stores a computer program which may run on the processor, herein when executing the program, the processor implements the steps of any of the above data processing methods.

On the basis of the same application concept, according to another aspect of the disclosure, the embodiments of the disclosure also provide a computer-readable storage medium. A computer program is stored on the computer-readable storage medium. The computer program, when executed by a processor, implements the steps of any of the above data processing methods.

The disclosure has one of the following beneficial technical effects: the solution provided by the disclosure can directly write chunk data to a disc for the issued chunk IO by use of an adaptive data grain, and only generate one meta data mapping relationship, that is, only one piece of corresponding meta data is only generated for variable-length logic grain, which can reduce the amount of meta data as much as possible, then reduce the insertion, mirroring, and disc flashing of the meta data, reduce the impact of the meta data on IO latency, and improve the throughput.

BRIEF DESCRIPTION OF THE DRAWINGS

In order to more clearly explain the technical solutions in the embodiments of the disclosure or in a traditional art, the drawings required in the descriptions of the embodiments or the traditional art will be briefly introduced below. It is apparent that the drawings in the following descriptions are only some embodiments of the disclosure. Those of ordinary skill in the art may also obtain other embodiments in accordance with these drawings without paying creative labor.

DETAILED DESCRIPTION OF THE EMBODIMENTS

To make the objectives, technical solutions, and advantages of the disclosure clearer, the embodiments of the disclosure are described below in detail with reference to specific embodiments and accompanying drawings.

It is to be noted that all expressions "first" and "second" used in the embodiments of the disclosure are used to distinguish that two same names are not the same entities or the same parameters. It is to be seen that "first" and "second" are only for the convenience of expression and shall not be understood as the limitation of the embodiments of the disclosure, which will not be explained in subsequent embodiments.

In the embodiment of the disclosure, grain is a data granularity, which is a smallest data unit.

Figure 1:
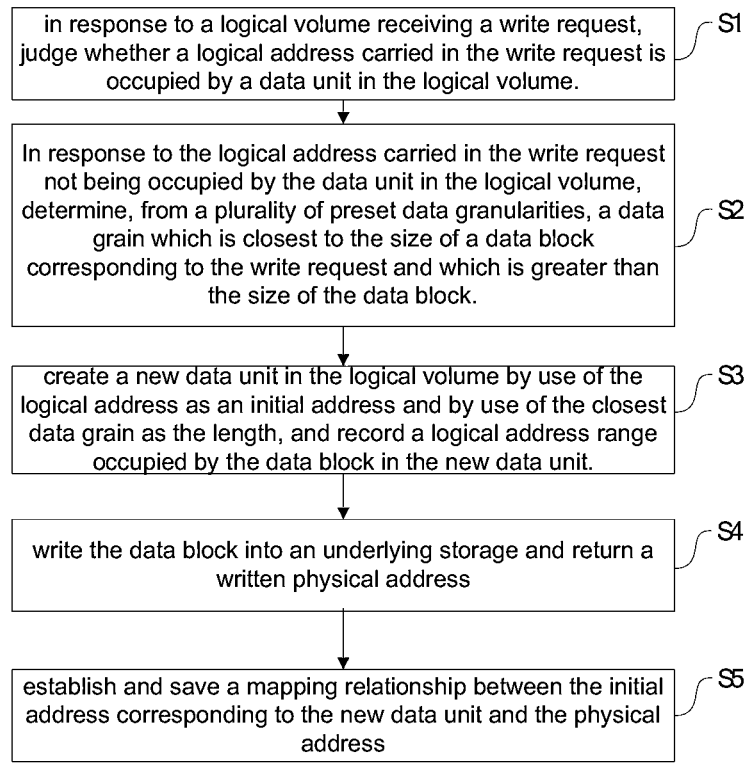
FIG. 1 is a schematic flowchart of a data processing method according to an embodiment of the disclosure.

According to an aspect of the disclosure, embodiments of the disclosure provide a data processing method which, as shown in FIG. 1, may include the following steps.

At S1, it is judged, in response to a logical volume receiving a write request, whether a logical address carried in the write request is occupied by a data unit in the logical volume.

At S2, in response to the logical address carried in the write request not being occupied by the data unit in the logical volume, a data grain which is closest to the size of a data block corresponding to the write request and which is greater than the size of the data block is determined from a plurality of preset data granularities.

At S3, a new data unit is created in the logical volume by use of the logical address as an initial address and by use of the closest data grain as the length, and a logical address range occupied by the data block in the new data unit is recorded.

At S4, the data block is written into an underlying storage and a written physical address is returned.

At S5, a mapping relationship between the initial address corresponding to the new data unit and the physical address is established and saved.

Figure 2:
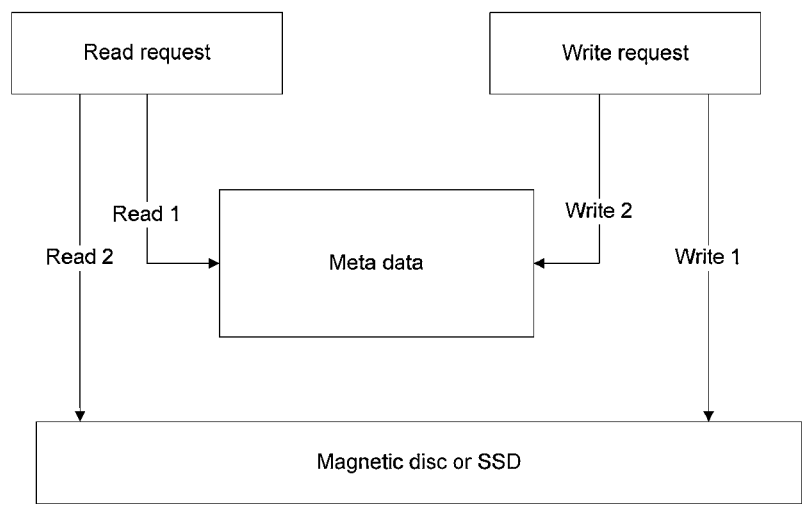
FIG. 2 is a schematic block diagram of data write and read according to an embodiment of the disclosure.

The solution provided by the disclosure can directly write chunk data to a disc for the issued chunk IO by use of an adaptive data grain, and only generate one meta data mapping relationship, that is, only one piece of corresponding meta data is generated for variable-length logic grain, which can reduce the amount of meta data as much as possible, then reduce the insertion, mirroring, and disc flashing of the meta data, reduce the impact of the meta data on IO latency, and improve the throughput.

in some embodiments, as shown in FIG. 2, when the data is written, a write request first writes the data to a magnetic disc or a Solid State Disc (SSD), that is, write 1. After returning from the magnetic disc or the SSD disc, a returned Physics Block Address (PBA) value is written into the meta data, that is, write 2. When the data is read, a read request first accesses the meta data to acquire the PBA value corresponding to a Logic Block Address (LBA), that is, read 1. After the PBA value is acquired from the meta data, the data is acquired from the magnetic disc or SSD disc, that is, read 2.

In the embodiment of the disclosure, the logical volume can organize the data unit according to a grain collection of [8 k, 32 k, 64 k, 128 k, 256 k, 512 k], etc., and a variable-length grain Size, and the logical volume may maintain a bit map table of the logical address range and the grain Size. When one logical address is written for the first time, an appropriate grain Size is selected according to the size of a block issued by a host, and is recorded in the bit map table, the chunk data issued by the host is written into the disc as chunk as possible, and a less amount of meta data is generated.

In some embodiments, in 51 that it is judged, in response to a logical volume receiving a write request, whether a logical address carried in the write request is occupied by a data unit in the logical volume, in an embodiment, when the logical volume receives the write request, search can be performed on the bit map table according to the logical address carried in the write request to judge whether the logical address is occupied. If the logical address is not occupied, which means first write, S2 can be performed. That is, in response to the logical address carried in the write request not being occupied by the data unit in the logical volume, a data grain which is closest to the size of the data block corresponding to the write request and which is greater than the size of the data block is determined from a plurality of preset data granularities. Then S3 of creating a new data unit and recording the logical address range occupied by the data block in the new data unit is performed. For example, when the size of the data block is 104 k, 128 k can be selected from [8 k, 32 k, 64 k, 128 k, 256 k, 512 k] as the data grain, and the new data unit with the size of 128 k can be created with the logical address corresponding to the data block as the initial address. Finally, the data block is written into the underlying storage and the written physical address is returned, and the mapping relationship between the initial address corresponding to the new data unit and the physical address is established and saved to the meta data. After the meta data saves same successfully, an IO request of the host is completed and returned to the host.

Thus, according to the size of the data block in the IO request, the data unit of the corresponding size is adaptively generated. After the data is written into the disc, only a mapping relationship between the logical address and the physical address needs to be generated, thus reducing the amount of the meta data, and accordingly reducing the impact of the meta data on IO latency and improving the throughput.

In some embodiments, the following operations are further included.

In response to the logical address carried in the write request being occupied by the data unit in the logical volume, a logical address range corresponding to the data block is determined according to the logical address carried in the write request and the size of the data block.

A relationship between the logical address range corresponding to the data block and the logical address range of the data unit is determined.

In response to the logical address range corresponding to the data block being the same as the logical address range of the data unit, the data block is written into the underlying storage and the written physical address is returned.

The mapping relationship between the initial address corresponding to the data unit and the returned physical address is re-established and saved.

In an embodiment, if the logical address carried in the write request is occupied by the data unit in the logical volume, which means non-first write, at this time, the logical address range corresponding to the data block is determined according to the logical address carried in the write request and the size of the data block, and the relationship between the logical address ranges of the data unit can be determined on the basis of the logical address range.

The relationship between the logical address range corresponding to the data block and the logical address range of the data unit can be that the logical address range corresponding to the data block is the same as the logical address range of the data unit, that the logical address range corresponding to the data block is within the logical address range of the data unit, and that a part of the logical address range in the logical address range corresponding to the data block is within the logical address range of the data unit.

If the logical address range corresponding to the data block is the same as the logical address range of the data unit, it means that overwrite is performed at this time, that is, the data written last time corresponding to the logical address is completely covered by the data written this time. Then the data block can be written into the underlying storage and the written physical address is returned, so as to re-establish and save the mapping relationship between the initial address corresponding to the data unit and the returned physical address.

In some embodiments, if the logical address range corresponding to the data block is within the logical address range of the data unit, the method further includes the following operations.

In response to the logical address range corresponding to the data block being within the logical address range of the data unit, another data block is acquired from the underlying storage according to the mapping relationship corresponding to the data unit.

It is judged whether the logical address range corresponding to the data block is occupied by the another data block.

In response to the logical address range corresponding to the data block not being occupied by the another data block, the acquired another data block is merged with the data block, and the merged data block is written into the underlying storage and the written physical address is returned.

The mapping relationship between the initial address corresponding to the data unit and the returned physical address is re-established and saved.

In some embodiments, the following operations are further included.

In response to the logical address range corresponding to the data block being occupied by the another data block, a logical address range the same as the another data block is determined.

The same logical address range is removed from the logical address range corresponding to the another data block and then a sub-logical address range is obtained.

A sub-data block corresponding to the sub-logical address range in the another data block is determined, and the sub-data block is merged with the data block.

The merged data block is written into the underlying storage and the written physical address is returned, so as to re-establish and save the mapping relationship between the initial address corresponding to the data unit and the returned physical address.

In an embodiment, if the logical address range corresponding to the data block is within the logical address range of the data unit, the corresponding another data block needs to be first acquired from the underlying storage according to the mapping relationship corresponding to the data unit (that is, the mapping relationship between the initial address of the data unit and the physical address). Then it is judged whether the logical address of the data block to be written this time is occupied by the another data block in the current data unit.

If the logical address corresponding to the data block to be written this time is not occupied by the another data block, the acquired another data block is merged with the data block to be written this time, then the merged data block is written into the underlying storage and the written physical address is returned, and the mapping relationship between the initial address corresponding to the data unit and the returned physical address is re-established and saved.

If the logical address corresponding to the data block to be written this time is occupied by the another data block, a repeated logical address range is first determined, that is, the part, the same as the logical address corresponding to the another data block, of the logical address corresponding to the data block written this time. Then the same logical address range is removed from the logical address range corresponding to the another data block to obtain the sub-logical address range, the sub-data block corresponding to the sub-logical address range is merged with the data block written this time, and finally the merged data block is written into the underlying storage and the written physical address is returned, so as to re-establish and save the mapping relationship between the initial address corresponding to the data unit and the returned physical address.

In some embodiments, if a part of the logical address range in the logical address range corresponding to the data block is within the logical address range of the data unit, the method further includes the following operations.

In response to a part of the logical address range in the logical address range corresponding to the data block being within the logical address range of the data unit, the another data block is acquired from the underlying storage according to the mapping relationship corresponding to the data unit.

It is judged whether the part of the logical address range is occupied by the another data block.

In response to the part of the logical address range not being occupied by the another data block, the acquired another data block is merged with a part of the data block corresponding to the part of the logical address range, and the merged data block is written into the underlying storage and the written physical address is returned, so as to re-establish and save the mapping relationship between the initial address corresponding to the data unit and the returned physical address.

In response to the part of the logical address range being occupied by the another data block, the logical address range the same as the another data block is determined.

The same logical address range is removed from the logical address range corresponding to the another data block and then the sub-logical address range is obtained.

The sub-data block corresponding to the sub-logical address range in the another data block is determined, and the sub-data block is merged with the part of the data block.

The merged data block is written into the underlying storage and the written physical address is returned, so as to re-establish and save the mapping relationship between the initial address corresponding to the data unit and the returned physical address.

In an embodiment, if a part of the logical address range in the logical address range corresponding to the data block to be written this time is within the logical address range of the data unit, the another data block is first acquired according to the corresponding mapping relationship of the data unit, and it is judged whether the part of the logical address range corresponding to the data block to be written this time is occupied by the another data block.

If the part of the logical address range is not occupied by the another data block, likewise, the acquired another data block is merged with a part of the data block corresponding to the part of the logical address range, and the merged data block is written into the underlying storage and the written physical address is returned, so as to re-establish and save the mapping relationship between the initial address corresponding to the data unit and the returned physical address.

If the part of the logical address range is occupied by the another data block, likewise, the logical address range the same as the another data block is first determined, then the same logical address range is removed from the logical address range corresponding to the another data block to obtain the sub-logical address range, the sub-data block corresponding to the sub-logical address range is merged with the part of the data block, and the merged data block is written into the underlying storage and the written physical address is returned, so as to re-establish and save the mapping relationship between the initial address corresponding to the data unit and the returned physical address.

In some embodiments, the following operations are further included.

With respect to another part of the logical address range beyond the logical address range of the data unit in the logical address range corresponding to the data block, a data grain which is closest to the size of another part of the data block corresponding to the another part of the logical address range and which is greater than the size of the another part of the data block is determined from the plurality of preset data granularities.

A data unit to be created is created in the logical volume by use of the initial address of the another part of the logical address range as the initial address of the data unit to be created and by use of the closest data grain as the length, and the logical address range occupied by the another part of the data block in the data unit to be created is recorded.

The another part of the data block is written into the underlying storage and the written physical address is returned, so as to establish and save the mapping relationship between the initial address corresponding to the data unit to be created and the returned physical address.

In an embodiment, when the another part of the logical address range corresponding to the data block is beyond the logical address of the data unit, the data grain which is closest to the size of the another part of the data block corresponding to the another part of the logical address range and which is greater than the size of the another part of the data block needs to be first determined from the plurality of preset data granularities, and then the new data unit is created and the logical address range occupied by the another part of the data block in the new data unit is recorded; then the data block is written into the underlying layer and the returned physical address is received; and finally the mapping relationship between the initial address corresponding to the data unit and the returned physical address is established and saved.

In some embodiments, the following operations are further included.

In response to the logical volume receiving the read request, the number of corresponding data units is determined according to the logical address range corresponding to data to be read carried in the read request.

In response to corresponding to one data unit, the corresponding physical address is acquired according to the initial address corresponding to the data unit, so as to read the data to be read in the underlying storage according to the physical address.

In response to corresponding to a plurality of data units, the read request is split into a plurality of sub-read requests, where each sub-read request reads data corresponding to one data unit.

The corresponding physical address is acquired according to the initial address corresponding to each data unit.

It is judged whether the acquired multiple corresponding physical addresses are continuous or not.

In response to the acquired multiple corresponding physical addresses being continuous, the plurality of sub-read requests are constructed as one IO and the IO is issued to the underlying storage to return data corresponding to the multiple continuous physical addresses.

In response to the acquired multiple corresponding physical addresses being non-continuous, the plurality of sub-requests are constructed as a plurality of IOs according to the corresponding physical addresses, the IOs are issued to the underlying storage in sequence, and then the corresponding data is returned.

In an embodiment, if the logical volume receives the read request, the corresponding data unit can be searched in the bit map table according to the logical address range corresponding to the data to be read carried in the read request, so as to determine the number of the data units corresponding to the logical address range.

If corresponding to one data unit, the corresponding physical address is acquired according to the initial address corresponding to the data unit, so as to read the data to be read in the underlying storage according to the physical address.

If corresponding to a plurality of data units, the read request is first split into the plurality of sub-read requests, where each sub-read request reads the data corresponding to one data unit; then the corresponding physical address is acquired according to the initial address corresponding to each data unit; it is judged whether the physical addresses are continuous or not; and if non-continuous, the continuous physical addresses can be merged and issued. That is, the plurality of sub-requests is constructed as a plurality of IOs according to the corresponding physical addresses, and the IOs are issued to the underlying storage in sequence. For example, if the read request is split into five sub-read requests, where the physical addresses corresponding to sub-request 1, sub-request 2 and sub-request 3 are continuous, and the physical addresses corresponding to sub-request 4 and sub-request 5 are continuous, sub-request 1, sub-request 2 and sub-request 3 can be constructed as one IO to acquire the data, and sub-request 4 and sub-request 5 can be constructed as another IO to acquire the data.

The solution provided by the disclosure can directly write chunk data to a disc for the issued chunk IO by use of an adaptive data grain, and only generate one meta data mapping relationship, that is, only one piece of corresponding meta data is generated for variable-length logic grain, which can reduce the amount of meta data as much as possible, then reduce the insertion, mirroring, and disc flashing of the meta data, reduce the impact of the meta data on IO latency, and improve the throughput.

Figure 3:
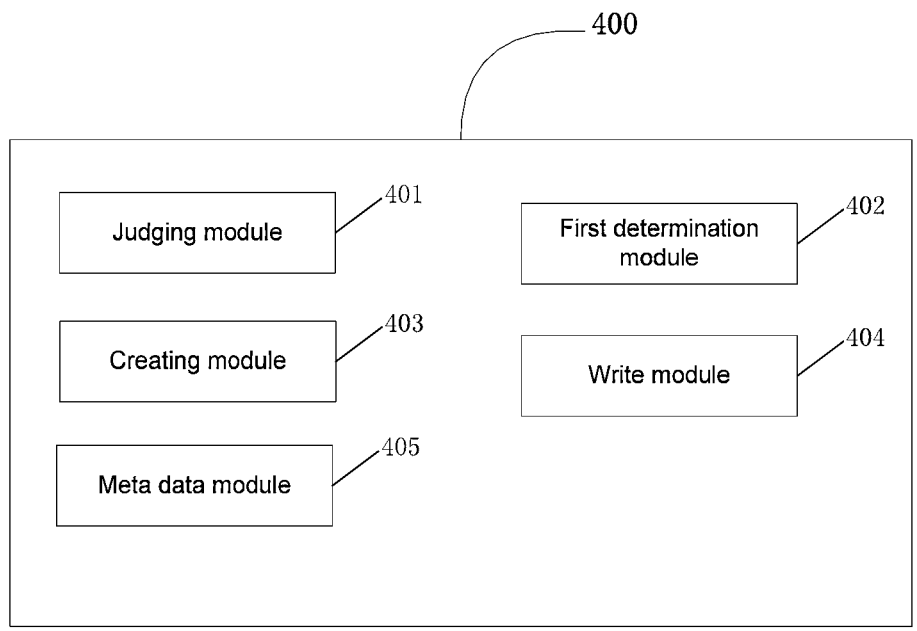
FIG. 3 is a schematic structural diagram of a data processing system according to an embodiment of the disclosure.

On the basis of the same application concept, according to another aspect of the disclosure, the embodiments of the disclosure also provide a data processing system 400, as shown in FIG. 3, including: a judging module 401, a first determination module 402, a creating module 403, a write module 404 and a meta data module 405.

The judging module 401 is configured to judge, in response to a logical volume receiving a write request, whether a logical address carried in the write request is occupied by a data unit in the logical volume.

The first determination module 402 is configured to determine, in response to the logical address carried in the write request not being occupied by the data unit in the logical volume, a data grain which is closest to the size of a data block corresponding to the write request and which is greater than the size of the data block from a plurality of preset data granularities.

The creating module 403 is configured to create a new data unit in the logical volume by use of the logical address as an initial address and by use of the closest data grain as the length and to record a logical address range occupied by the data block in the new data unit.

The write module 404 is configured to write the data block into an underlying storage and return a written physical address.

The meta data module 405 is configured to establish and save a mapping relationship between the initial address corresponding to the new data unit and the physical address.

In some embodiments, the following operations are further included.

In response to the logical address carried in the write request being occupied by the data unit in the logical volume, a logical address range corresponding to the data block is determined according to the logical address carried in the write request and the size of the data block.

A relationship between the logical address range corresponding to the data block and the logical address range of the data unit is determined.

In response to the logical address range corresponding to the data block being the same as the logical address range of the data unit, the data block is written into the underlying storage and the written physical address is returned.

The mapping relationship between the initial address corresponding to the data unit and the returned physical address is re-established and saved.

In some embodiments, the following operations are further included.

In response to the logical address range corresponding to the data block being within the logical address range of the data unit, another data block is acquired from the underlying storage according to the mapping relationship corresponding to the data unit.

It is judged whether the logical address range corresponding to the data block is occupied by the another data block.

In response to the logical address range corresponding to the data block not being occupied by the another data block, the acquired another data block is merged with the data block, and the merged data block is written into the underlying storage and the written physical address is returned.

The mapping relationship between the initial address corresponding to the data unit and the returned physical address is re-established and saved.

In some embodiments, the following operations are further included.

In response to the logical address range corresponding to the data block being occupied by the another data block, a logical address range the same as the another data block is determined.

The same logical address range is removed from the logical address range corresponding to the another data block and then the sub-logical address range is obtained.

A sub-data block corresponding to the sub-logical address range in the another data block is determined, and the sub-data block is merged with the data block.

The merged data block is written into the underlying storage and the written physical address is returned, so as to re-establish and save the mapping relationship between the initial address corresponding to the data unit and the returned physical address.

In some embodiments, the following operations are further included.

In response to a part of the logical address range in the logical address range corresponding to the data block being within the logical address range of the data unit, the another data block is acquired from the underlying storage according to the mapping relationship corresponding to the data unit.

It is judged whether the part of the logical address range is occupied by the another data block.

In response to the part of the logical address range not being occupied by the another data block, the acquired another data block is merged with a part of the data block corresponding to the part of the logical address range, and the merged data block is written into the underlying storage and the written physical address is returned, so as to re-establish and save the mapping relationship between the initial address corresponding to the data unit and the returned physical address.

In response to the part of the logical address range being occupied by the another data block, the logical address range the same as the another data block is determined.

The same logical address range is removed from the logical address range corresponding to the another data block and then the sub-logical address range is obtained.

The sub-data block corresponding to the sub-logical address range in the another data block is determined, and the sub-data block is merged with the part of the data block.

The merged data block is written into the underlying storage and the written physical address is returned, so as to re-establish and save the mapping relationship between the initial address corresponding to the data unit and the returned physical address.

In some embodiments, the following operations are further included.

With respect to another part of the logical address range beyond the logical address range of the data unit in the logical address range corresponding to the data block, a data grain which is closest to the size of another part of the data block corresponding to the another part of the logical address range and which is greater than the size of the another part of the data block is determined from the plurality of preset data granularities.

A data unit to be created is created in the logical volume by use of the initial address of the another part of the logical address range as the initial address of the data unit to be created and by use of the closest data grain as the length, and the logical address range occupied by the another part of the data block in the data unit to be created is recorded.

The another part of the data block is written into the underlying storage and the written physical address is returned, so as to establish and save the mapping relationship between the initial address corresponding to the data unit to be created and the returned physical address.

In some embodiments, the following operations are further included.

In response to the logical volume receiving the read request, the number of corresponding data units is determined according to the logical address range corresponding to data to be read carried in the read request.

In response to corresponding to one data unit, the corresponding physical address is acquired according to the initial address corresponding to the data unit, so as to read the data to be read in the underlying storage according to the physical address.

In response to corresponding to a plurality of data units, the read request is split into a plurality of sub-read requests, where each sub-read request reads data corresponding to one data unit.

The corresponding physical address is acquired according to the initial address corresponding to each data unit.

It is judged whether the acquired multiple corresponding physical addresses are continuous or not.

In response to the acquired multiple corresponding physical addresses being continuous, the plurality of sub-read requests are constructed as one IO and the IO is issued to the underlying storage to return data corresponding to the multiple continuous physical addresses.

In response to the acquired multiple corresponding physical addresses being non-continuous, the plurality of sub-requests are constructed as a plurality of IOs according to the corresponding physical addresses, the IOs are issued to the underlying storage in sequence, and then the corresponding data is returned.

Figure 4:
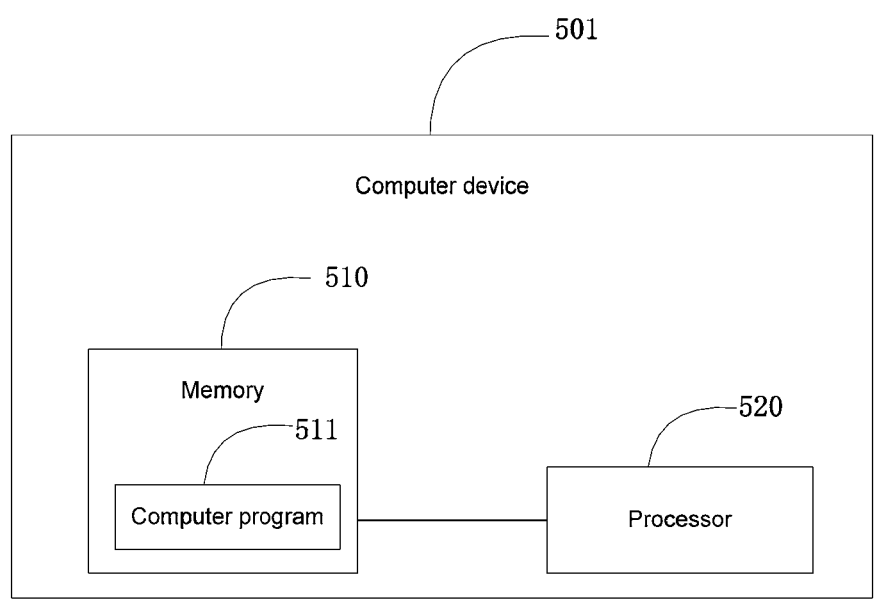
FIG. 4 is a schematic structural diagram of a computer device according to an embodiment of the disclosure.

On the basis of the same application concept, according to another aspect of the disclosure, as shown in FIG. 4, the embodiments of the disclosure also provide a computer device 501, including at least one processor 520, and a memory 510.

The memory 510 stores a computer program 511 which may run on the processor, herein when executing the program, the processor 520 implements the steps of any of the above data processing methods.

Figure 5:
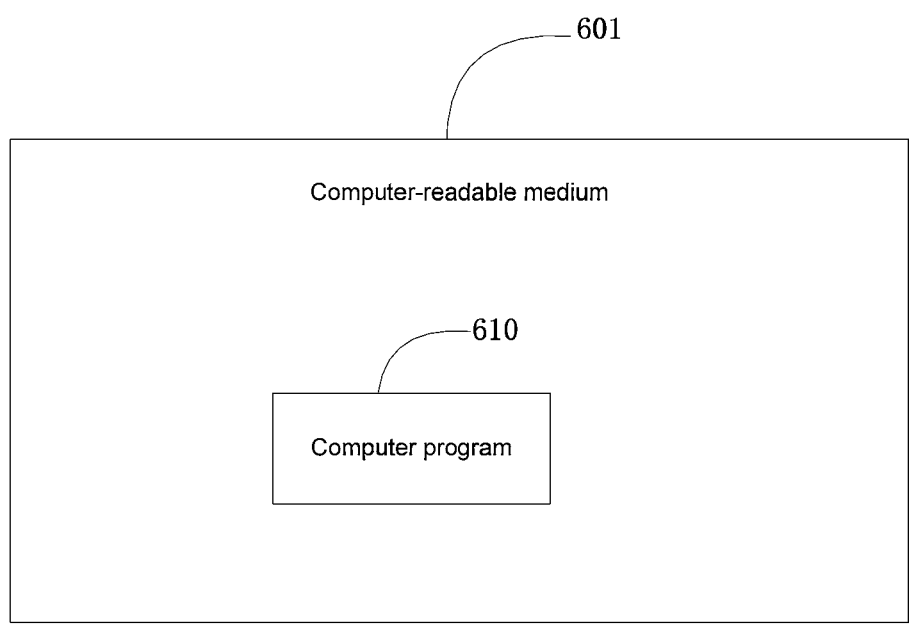
FIG. 5 is a schematic structural diagram of a computer-readable storage medium according to an embodiment of the disclosure.

On the basis of the same application concept, according to another aspect of the disclosure, as shown in FIG. 5, the embodiments of the disclosure also provide a computer-readable storage medium 601. A computer program instruction 610 is stored on the computer-readable storage medium 601. The computer program instruction 610, when executed by a processor, implements the steps of any of the above data processing methods.

It is finally to be noted that those of ordinary skill in the art may understand that implementation of all or part of the processes in the above embodiment method may be completed by instructing related hardware through a computer program, and the program may be stored in a computer-readable storage medium. The program, when executed, may include the processes of the embodiments of the above methods.

In addition, it should be appreciated that the computer-readable storage medium (such as the memory) herein may be a volatile memory or a nonvolatile memory, or may include both the volatile memory and the nonvolatile memory.

It is also to be appreciated by those skilled in the art that the various illustrative logical blocks, modules, circuits, and algorithm steps described in conjunction with the disclosure herein may be implemented as electronic hardware, computer software, or a combination of the two. In order to clearly illustrate the interchangeability of the hardware and software, various illustrative components, blocks, modules, circuits, and steps have been described generally in terms of their functionality. Whether the functionality is implemented as the software or as the hardware depends upon a particular application and design constraints imposed on the overall system. Those skilled in the art may implement the functions in various ways for each specific application, but such implementation decision should not be interpreted as causing a departure from the scope disclosed in the embodiments of the disclosure.

The above are the exemplary embodiments disclosed in the disclosure, but it should be noted that various changes and modifications can be made without departing from the scope of the embodiments disclosed in the disclosure defined by the claims. The functions, steps and/or actions of the method claims according to the disclosed embodiments described herein need not be executed in any particular order. In addition, although the elements disclosed in the embodiments of the disclosure can be described or claimed in individual form, they can also be understood as multiple unless explicitly limited to singular.

It should be understood that, as used herein, the singular form "a" and "one" is intended to also include the plural form unless the context clearly supports exceptions. It should also be understood that "and/or" as used herein means any and all possible combinations including one or more items listed in association.

The embodiment numbers disclosed in the above embodiments of the disclosure are adopted not to represent superiority-inferiority of the embodiments but only for description.

Those of ordinary skill in the art may understand that all or part of the steps to realize the above embodiments can be completed by hardware, or related hardware can be instructed to complete by programs, the programs can be stored in a computer-readable storage medium, and the storage medium may be a read-only memory, a magnetic disk or an optical disk, etc.

Those of ordinary skill in the art should understand that the discussion of any of the above embodiments is only exemplary, and is not intended to imply that the scope (including the claims) disclosed by the embodiments of the disclosure is limited to these examples. Under the idea of the embodiments of the disclosure, technical features in the above embodiments or different embodiments may also be combined, and there are many other variations of different aspects of the above embodiments of the disclosure, which are not provided in details for brevity. Therefore, any omission, modification, equivalent substitution, improvement, etc. made within the spirit and principle of the embodiments of the disclosure should be included in the scope of protection of the embodiments of the disclosure.

What is claimed is:

1. A data processing method, comprising:
determining, in response to a logical volume receiving a write request, whether a logical address carried in the write request is occupied by a data unit in the logical volume;
determining, in response to the logical address carried in the write request not being occupied by the data unit in the logical volume, a data grain which is closest to a size of a data block corresponding to the write request and which is greater than the size of the data block from a plurality of preset data granularities;
creating a new data unit in the logical volume by use of the logical address as an initial address and by use of the closest data grain as a length, and recording a logical address range occupied by the data block in the new data unit;
writing the data block into an underlying storage and returning a written physical address; and
establishing and saving a mapping relationship between the initial address corresponding to the new data unit and the physical address.

2. The method according to claim 1, further comprising:
determining, in response to the logical address carried in the write request being occupied by the data unit in the logical volume, a logical address range corresponding to the data block according to the logical address carried in the write request and the size of the data block;
determining a relationship between the logical address range corresponding to the data block and the logical address range of the data unit;
writing, in response to the logical address range corresponding to the data block being the same as the logical address range of the data unit, the data block into the underlying storage and returning the written physical address; and
re-establishing and saving the mapping relationship between the initial address corresponding to the data unit and the returned physical address.

3. The method according to claim 2, further comprising:
acquiring, in response to the logical address range corresponding to the data block being within the logical address range of the data unit, another data block from the underlying storage according to the mapping relationship corresponding to the data unit;
judging whether the logical address range corresponding to the data block is occupied by the another data block;
merging, in response to the logical address range corresponding to the data block not being occupied by another data block, the acquired another data block with the data block, and writing the merged data block into the underlying storage and returning the written physical address; and
re-establishing and saving the mapping relationship between the initial address corresponding to the data unit and the returned physical address.

4. The method according to claim 2, further comprising:
determining, with respect to another part of the logical address range beyond the logical address range of the data unit in the logical address range corresponding to the data block, a data grain which is closest to the size of another part of the data block corresponding to the another part of the logical address range and which is greater than the size of the another part of the data block from the plurality of preset data granularities;
creating a data unit to be created in the logical volume by use of the initial address of the another part of the logical address range as the initial address of the data unit to be created and by use of the data grain which is closest to the size of another part of the data block as the length, and recording the logical address range occupied by the another part of the data block in the data unit to be created; and
writing the another part of the data block into the underlying storage and returning the written physical address, so as to establish and save the mapping relationship between the initial address corresponding to the data unit to be created and the returned physical address.

5. The method according to claim 1, further comprising:
determining, in response to the logical volume receiving a read request, the number of corresponding data units according to the logical address range corresponding to data to be read carried in the read request;
acquiring, in response to corresponding to one data unit, the corresponding physical address according to the initial address corresponding to the data unit, so as to read the data to be read in the underlying storage according to the physical address;
splitting, in response to corresponding to a plurality of data units, the read request into a plurality of sub-read requests, where each sub-read request reads data corresponding to one data unit; acquiring the corresponding physical address according to the initial address corresponding to each data unit;
judging whether the acquired multiple corresponding physical addresses are continuous or not;
constructing, in response to the acquired multiple corresponding physical addresses being continuous, the plurality of sub-read requests as one Input/Output (IO) and issuing the IO to the underlying storage to return data corresponding to the multiple continuous physical addresses; and
constructing, in response to the acquired multiple corresponding physical addresses being non-continuous, the plurality of sub-requests as a plurality of IOs according to the corresponding physical addresses, issuing the IOs to the underlying storage in sequence, and then returning the corresponding data.

6. The method according to claim 1, wherein the data grain size comprises one of: 8K, 32k, 64k, 128k, 256k, 512k.

7. The method according to claim 1, wherein when a data is written, a write request first writes the data to a magnetic disc or a Solid State Disc (SSD), then a returned Physics Block Address (PBA) value from the magnetic disc or the SSD is written into a meta data.

8. The method according to claim 7, wherein when the data is read, a read request first accesses the meta data to acquire the PBA value corresponding to a Logic Block Address (LBA), after the PBA value is acquired from the meta data, the data is acquired from the magnetic disc or the SSD.

9. A computer device, comprising:
at least one processor; and
a memory storing a computer program, when the computer program is executed by the at least one processor, the at least one processor is configured to:
determine, in response to a logical volume receiving a write request, whether a logical address carried in the write request is occupied by a data unit in the logical volume;

determine, in response to the logical address carried in the write request not being occupied by the data unit in the logical volume, a data grain which is closest to a size of a data block corresponding to the write request and which is greater than the size of the data block from a plurality of preset data granularities;

create a new data unit in the logical volume by use of the logical address as an initial address and by use of the closest data grain as a length, and record a logical address range occupied by the data block in the new data unit;

write the data block into an underlying storage and returning a written physical address; and establish and save a mapping relationship between the initial address corresponding to the new data unit and the physical address.

10. The computer device according to claim 9, the at least one processor is further configured to:

determine, in response to the logical address carried in the write request being occupied by the data unit in the logical volume, a logical address range corresponding to the data block according to the logical address carried in the write request and the size of the data block;

determine a relationship between the logical address range corresponding to the data block and the logical address range of the data unit;

write, in response to the logical address range corresponding to the data block being the same as the logical address range of the data unit, the data block into the underlying storage and returning the written physical address; and re-establish and save the mapping relationship between the initial address corresponding to the data unit and the returned physical address.

11. The computer device according to claim 10, the at least one processor is further configured to:

acquire, in response to the logical address range corresponding to the data block being within the logical address range of the data unit, another data block from the underlying storage according to the mapping relationship corresponding to the data unit;

judge whether the logical address range corresponding to the data block is occupied by the another data block;

merge, in response to the logical address range corresponding to the data block not being occupied by another data block, the acquired another data block with the data block, and write the merged data block into the underlying storage and returning the written physical address; and re-establish and save the mapping relationship between the initial address corresponding to the data unit and the returned physical address.

12. The computer device according to claim 10, the at least one processor is further configured to:

determine, with respect to another part of the logical address range beyond the logical address range of the data unit in the logical address range corresponding to the data block, a data grain which is closest to the size of another part of the data block corresponding to the another part of the logical address range and which is greater than the size of the another part of the data block from the plurality of preset data granularities;

create a data unit to be created in the logical volume by use of the initial address of the another part of the logical address range as the initial address of the data unit to be created and by use of the data grain which is closest to the size of another part of the data block as the length, and record the logical address range occupied by the another part of the data block in the data unit to be created; and write the another part of the data block into the underlying storage and return the written physical address, so as to establish and save the mapping relationship between the initial address corresponding to the data unit to be created and the returned physical address.

13. The computer device according to claim 9, the at least one processor is further configured to:

determine, in response to the logical volume receiving a read request, the number of corresponding data units according to the logical address range corresponding to data to be read carried in the read request;

acquire, in response to corresponding to one data unit, the corresponding physical address according to the initial address corresponding to the data unit, so as to read the data to be read in the underlying storage according to the physical address;

split, in response to corresponding to a plurality of data units, the read request into a plurality of sub-read requests, where each sub-read request reads data corresponding to one data unit; acquiring the corresponding physical address according to the initial address corresponding to each data unit;

judge whether the acquired multiple corresponding physical addresses are continuous or not;

construct, in response to the acquired multiple corresponding physical addresses being continuous, the plurality of sub-read requests as one Input/Output (IO) and issue the IO to the underlying storage to return data corresponding to the multiple continuous physical addresses; and construct, in response to the acquired multiple corresponding physical addresses being non-continuous, the plurality of sub-requests as a plurality of IOs according to the corresponding physical addresses, issue the IOs to the underlying storage in sequence, and then returning the corresponding data.

14. A non-transitory computer-readable storage medium, a computer program being stored on the computer-readable storage medium, when executed by a processor, the computer program is configured to cause the processor to:

determine, in response to a logical volume receiving a write request, whether a logical address carried in the write request is occupied by a data unit in the logical volume;

determine, in response to the logical address carried in the write request not being occupied by the data unit in the logical volume, a data grain which is closest to a size of a data block corresponding to the write request and which is greater than the size of the data block from a plurality of preset data granularities;

create a new data unit in the logical volume by use of the logical address as an initial address and by use of the closest data grain as a length, and record a logical address range occupied by the data block in the new data unit;

write the data block into an underlying storage and returning a written physical address; and establish and save a mapping relationship between the initial address corresponding to the new data unit and the physical address.

* * * * *